United States Patent [19]
Taylor, II

[11] Patent Number: 5,222,025
[45] Date of Patent: Jun. 22, 1993

[54] METHOD OF GENERATING FRESNEL MIRRORS SUITABLE FOR USE WITH IMAGE DISPLAY SYSTEMS

[75] Inventor: Roy Y. Taylor, II, Scottsville, N.Y.

[73] Assignee: Eastman Kodak Company, Rochester, N.Y.

[21] Appl. No.: 559,025

[22] Filed: Jul. 27, 1990

[51] Int. Cl.⁵ .................. G06F 15/46; G02B 5/10
[52] U.S. Cl. ........................... 364/468; 359/851
[58] Field of Search ............... 364/468; 359/850, 851, 359/852, 853, 857, 858, 859

[56] References Cited

U.S. PATENT DOCUMENTS

| | | | |
|---|---|---|---|
| 3,222,986 | 12/1965 | Altman | 88/24 |
| 3,296,509 | 1/1967 | Katchman | 317/258 |
| 3,363,506 | 1/1968 | Altman | 88/24 |
| 3,690,240 | 9/1972 | Gold | 95/42 |
| 4,006,971 | 2/1977 | Plummer | 350/293 |
| 4,636,050 | 1/1987 | Tohata et al. | 353/66 |
| 4,717,248 | 1/1988 | La Russa | 359/857 |
| 4,952,946 | 8/1990 | Clark et al. | 359/196 |
| 5,087,116 | 2/1992 | Taylor, II | 359/857 |

FOREIGN PATENT DOCUMENTS 132907 11/1978 German Democratic Rep. .

OTHER PUBLICATIONS

"Unusual Optics of the Polaroid SX-7 Land Camera", by Wm. T. Plummer, p. 5, Ins. 11-33.
Optical Engr. Design, by Robt. Hopkins, Dec. 1988, vol. 27, No. 12, pp. 1019-1026.
Display System Engineering, H. R. Luremberg, & R. L. Kuehn, pub. McGraw-Hill, 1968.

Primary Examiner—Jerry Smith
Assistant Examiner—Thomas E. Brown
Attorney, Agent, or Firm—Svetlana Z. Short

[57] ABSTRACT

A concave Fresnel mirror, suitable for use in image display systems. With proper orientation of the facet slopes of the Fresnel mirror, the angular field presentation to the eye will represent a constant magnification for all points in the object space at the nominal eye position determined from the intended application of the invention. This invention provides a numerical means to determine the facet slopes of off-axis Fresnel reflectors using commonly available spreadsheet software which is then easily transformed into numerical control data for cutting the desired configuration.

8 Claims, 6 Drawing Sheets

FIG. 1

Mag = $\Phi/\Phi_0$

METHOD OF GENERATING FRESNEL MIRRORS SUITABLE FOR USE WITH IMAGE DISPLAY SYSTEMS

CROSS-REFERENCE TO A RELATED APPLICATION

Reference is made to commonly assigned copending patent application Ser. No. 559,026, filed simultaneously herewith in the name of Roy Y. Taylor and entitled REFLECTIVE IMAGE DISPLAY, and now used as U.S. Pat. No. 5,087,116.

BACKGROUND OF THE INVENTION

1. Field of the Invention

The subject invention relates generally to a method of generating Fresnel reflectors utilized in specular image display systems that are used to magnify the appearance of planar objects for viewing by the eye.

2. Description Relative to the Prior Art

Concave reflective mirrors are sometimes used in a variety of imaging systems. It has long been known that a concave reflective mirror surface of revolution can be described by a conic equation of the general form:

$$y^2 - 2rx + px^2 = 0,$$

where y is the perpendicular distance from the axis of revolution to any given point on the surface, x is the distance from the point to a plane passing through the (y=0) origin and perpendicular to the axis of revolution, r is rms value of x and y, and p is a constant.

An alternative equation which can be shown is equivalent to the above equation is discussed in the user's manual to the Super Oslo optical computation program developed by Sinclair Optics of Pittsford, New York. This equation describes the sag of the curve as the distance measured parallel to the axis of revolution to any point on the surface from that point on the surface which coincides with the axis of revolution.

$$z = \frac{cr^2}{1 + \sqrt{1 - c^2(k+1)r^2}} + dr^4 + er^6 + fr^8 + gr^{10}$$

where z is the sag of that point as described in the preceding sentence, r is the rms value of any given point (x,y) on the surface, and c, e, e, f, g, are constants.

Since the optical surfaces most frequently employed by optical designers are sections of spheres, this case was assumed by the software designer to be the configuration of choice and is the default configuration unless aspherizing is specifically asked for. The manual describes the sphere as a special case of this equation where c=1/r=is constant for all points on the surface.

This optical design program also allows the designer to define the surface of a Fresnel lens. The manual defines this as "a hypothetical surface that has the power of a curved surface, but which is actually flat. In Super Oslo, a Fresnel surface is implemented by treating the surface as flat for the purpose of ray transfer, but curved for the purpose of refraction." (Reflection is a special case of refraction where the index of refraction is taken to be −1.0)

The method of surface determination in Super Oslo and other optical computing programs is primarily one of choosing: 1) what optical parameters of a system can be varied, 2) the limits of said variation, 3) the functions of system performance to improve, and 4) weighting factors for the variables and merit function which in effect establish preferences. The allowable parameter variables are changed slightly, the system error functions are calculated, and a number of iterations of this process repeated until the error functions have become minimized. As discussed by Dr. Robert Hopkins, in an article in *Optical Engineering Design*, (December 1988/Vol. 27, No. 12 pp. 1019-1026) the process that early lens designers used was limited by practicality to paraxial, meridional, and Coddington's rays and accumulated hands-on experience when designing lenses since calculations were made manually with arithmetic references to logarithm tables. Many of the error functions developed are based on the hypothesis the a perfect optical system will direct all the rays from a given object point to a single image point and attempts to reach this goal were evaluated by optical star testing in the shop. The evolution of optical design has primarily advanced along the line of increased computing efficiency which allows the designer to evaluate higher order aberrations in almost real time. However, the design approach remains essentially the same. Consequently, the process is still most efficient when dealing with rotationally symmetric elements, and centered, or nearly centered optical systems.

Figure 1:
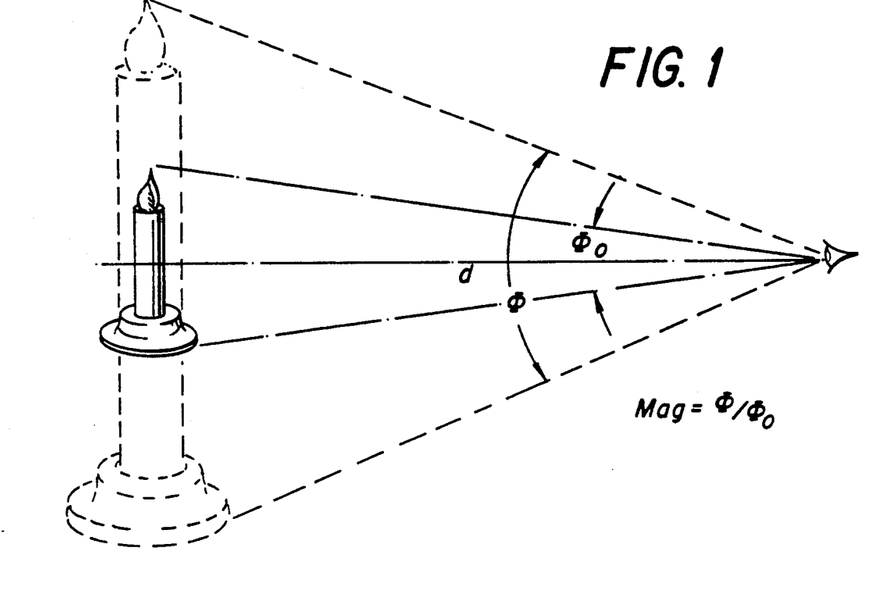
FIG. 1 is a side view of an optical system illustrating the prior art optical problem of magnifying an object subtending an angle of $\phi$ at a distance d so that the object appears to subtend an angle of $\phi_o$.

A typical prior art problem is to design an optical display which magnifies the appearance of an object. This is illustrated in FIG. 1 where the object subtends an angle $\Phi_o$ and through the effect of the display system appears to subtend an angle $\Phi$.

U.S. Pat. No. 4,717,248 describes a video display device where a spherical reflector is used in the off-axis specular display configuration to magnify a video screen. A plano, second mirror is also used to reinvert the image. It is suggested that tilting adjustments can be made to the video tube to eliminate trapezoidal distortion in the image. However, the ray-tracing technique herein described shows that a uniformly spaced square grid pattern on the video tube would be subject to non-linear stretching in the orthogonal directions parallel to the vertical and horizontal video image axis which cannot be eliminated by tilting the object plane. This stretching becomes a practical limitation to the potential magnifying power which could otherwise be increased by reducing the radius of curvature or relocating the object closer to the conjugate focus of the eye position. An improved surface to eliminate this pyramidal error, might be conceptually visualized, but would be difficult for the design process algorithms used in optical design programs like Super Oslo. The nominal object off-axis condition is further complicated by the fact that an observer's eyes are also off-axis in the + and − directions orthogonal to the decentering of the video tube.

The properties of a conic-section mirror can be approximated by a mirror utilizing the principles of a Fresnel lens. For example, such a construction is disclosed in my commonly assigned copending U.S. patent application Ser. No. 559,026, entitled REFLECTIVE IMAGE DISPLAY, filed simultaneously herewith in the name of Roy Y. Taylor and is hereby incorporated by reference. The modern method of fabrication is to turn inverse facets on a master mold plate using a special numerically-controlled lathe and a tool containing the inverse facet curvature. The slope of the tool is changed as a function of the radius from the axis of revolution of the mold plate, thus assuring the proper slope geometry and smoothness. Fresnel lenses can subsequently be replicated from the master in relatively thin sections without sinks or distortions of profile by compression molding. It would therefore be a potential advantage to replace the spherical mirror of U.S. Pat. No. 4,717,248 with a Fresnel mirror which was constructed to retroreflect like a spherical mirror. However, if a configuration similar to U.S. Pat. No. 4,717,248 is used with a Fresnel spherical mirror, a likewise image stretching distortion error results that leads to a likewise limitation of the invention's usefulness.

However, numerically-controlled tool guidance can also produce more complex surfaces than rotationally-symmetric surfaces. If the tool is programmed to swing through an angle about an axis perpendicular to the axis of revolution which is a function of the degree of revolution from some reference point on the workpiece, a Fresnel equivalent to an off-axis ellipse can be generated. This type of Fresnel surface was described in an article in the Jan. 1982 issue of APPLIED OPTICS (Vol. 21, No. 2), "Unusual Optics of the Polaroid SX-70 Land Camera", by William T. Plummer, "Although the focus screen is spread flat and its grooves are circular, astigmatism has been introduced to it by wobbling the diamond cutting tool two cycles per revolution, so that the relationship between slope and distance from the optical center has been arranged differently along the longitudinal and lateral axes." This article further elaborate on how the equation for this curve was determined: "The concave mirror is described by a eighth-order polynomial of revolution with the axis just below the part." The purpose of this concave mirror was described in the U.S. Pat. No. 4,006,971 by William Plummer and a similar mirror in U.S. Pat. No. 3,690,240 by Nathan Gold, assignors to Polaroid Corporation, was to reflect light emanating from a real or apparent point to be reflected therefrom and imaged at a predetermined remote exit pupil. Although not so stated, this suggests that the error function used to optimize the surface parameters was the point spread function at the desired remote exit pupil location.

SUMMARY OF THE INVENTION

This invention teaches a method for organizing the data of a specular surface, particularly when formed as a Fresnel reflector, and for utilizing the organized data to generate such a surface so that the image distortions can be minimized and angular magnification controlled. By surface generation I mean either the design or manufacture of the design and manufacture of such surfaces.

An advantage of machining by numerical control means is that the position angles and coordinates of the cutting tool can be smoothly changed by a series of instructions which represent sample points on the desired part configuration. While a better approximation of the desired surface may be achieved by increasing the number of sample points, and while it is possible to generate a series of sample points using a mathematical function, it is not necessary to discretely represent the desired surface as a mathematical function. The desired part configuration can be described from a series of empirical points and a resulting part can be machined with relatively smooth transitions of surface contours from point-to-point. It is this feature of machining which would allow a Fresnel reflector with largely empirical slope changes to be generated in order to make a mold from which replicates can be molded.

Whereas in the analog description of the Fresnel surface made earlier, the spherical properties are resolved to a flat plane perpendicular to the axis of the cylinder of concentric tubes, the use of numerical control machining would allow one to resolve the spherical properties to a flat plane at an oblique angle to the axis of the cylinder or indeed to some other geometric profile which might offer new and unexpected advantages.

This invention proposes that a valid and successful approach to generation of Fresnel reflectors can be accomplished empirically point-by-point at various locations on the working aperture to generate a general asphere. The prior art addresses the use of Fresnel reflectors as substitutes for optical surfaces which are described as conic sections. Optical computing methods are optimized to calculate the coefficients of the expansions of the above-forementioned conic section equation.

It is, therefore, appropriate in a specular display mode of functioning to define the optimal Fresnel reflector as a planar reflecting surface with a multiplicity of turned facets and with the facet faces at a multiplicity of points in the aperture that are properly aligned to reflect the vector emanating from the eye toward the facet face under consideration directly toward a correctly correlated point on the object surface. It is possible to develop the tool program to generate this Fresnel surface without describing its mathematical equation as long as a sufficiently high number of facet slopes were discretely calculated and that the numerically-controlled lathe make essentially smooth transitions of tool orientation from point-to-point.

Figure 2:
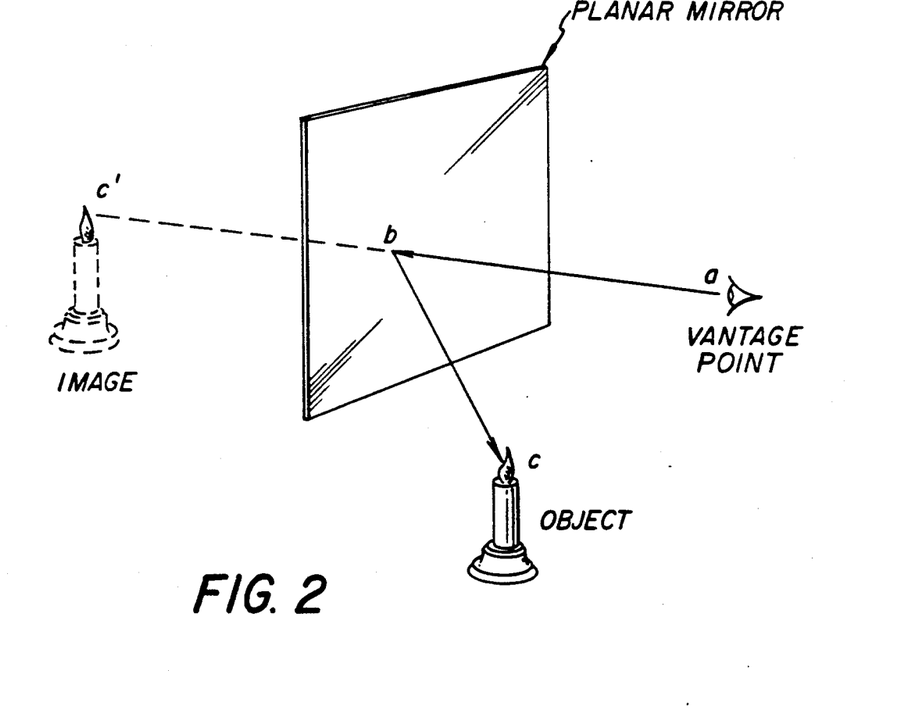
FIG. 2 is an illustration of the prior art directerix concept as applied to a planar mirror.

A simpler and more pragmatic approach to determining the facet geometry involves the concept of optical vectors which are hereafter referred to as "directerixes". FIG. 2 is an illustration of the "directerix" concept as applied to a planar mirror. Vector <a-b> is the input "directerix" from the eye to the mirror and vector <b-c> is the output "directerix" from the mirror to the object. A "directerix" from the eye is one of the chain of optical vectors extending from the center of the eye in that direction which the observer is gazing while examining a point on an object. Similarly, a "directerix" from the object point can be said to be one of the chain of optical vectors extending from the point of interest to the center of the eye. As optical vectors, "directerixes" will also conform to the the principles of refraction and reflection. When the eye is gazing at point c on the object, the "directerix path" is <a-b-c> and the image appears to be located at c'. As the observer rotates his eye from feature-to-feature on the object, while the head remains stationary, the center of rotation of the eye could be said to be the vantage point. Since an observer using a display device freely determines what point in the field is under examination at any point in time, it is convenient to think of optical axis of the eye as a reference axis and to evaluate the performance of the display system along that vector as a constraint. Although this is opposite from the direction of the optical flow of photons which gives rise to the image seen by the eye, the input to the system is determined by the observer and establishes the "input directerix" as the vector extending from the eye in the direction of attention. Similarly, as this vector is reflected and refracted by the display device, it eventually exits the said device and intercepts the object, and is therein referred to as the "output directerix".

Moreover, if the slopes of the facets of a Fresnel reflector used in a specular display similar to that described in U.S. Pat. No. 4,717,248 were properly determined to exactly reflect each directerix from a grid of points placed in the object plane to this vantage point from a user's eye while using the device, then the stretching errors associated with a reflector described by a conic equation would be greatly reduced and the system magnification could be increased by relocating the object plane to location where the output directerixes were more closely concentrated.

Figure 3:
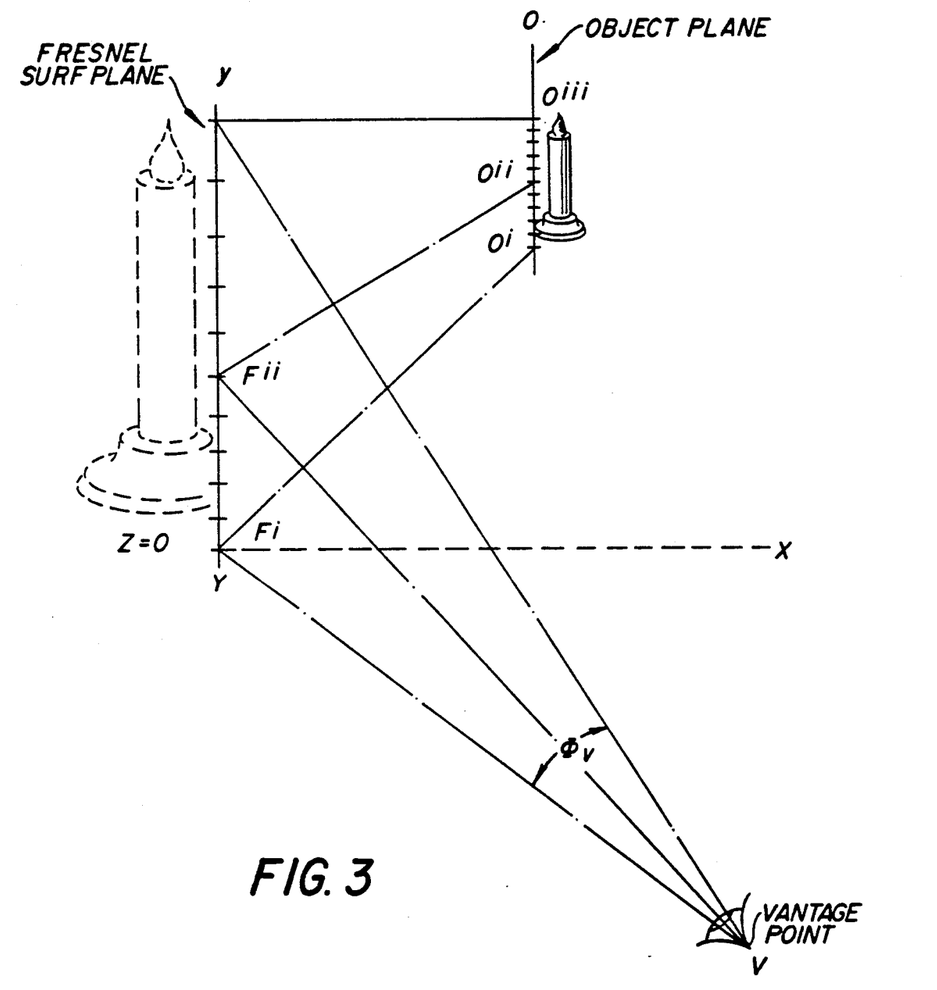
FIG. 3 is a side view of a Fresnel reflector arranged in a prior art specular display configuration to solve the said optical problem illustrated in FIG. 1.
Figure 4A:
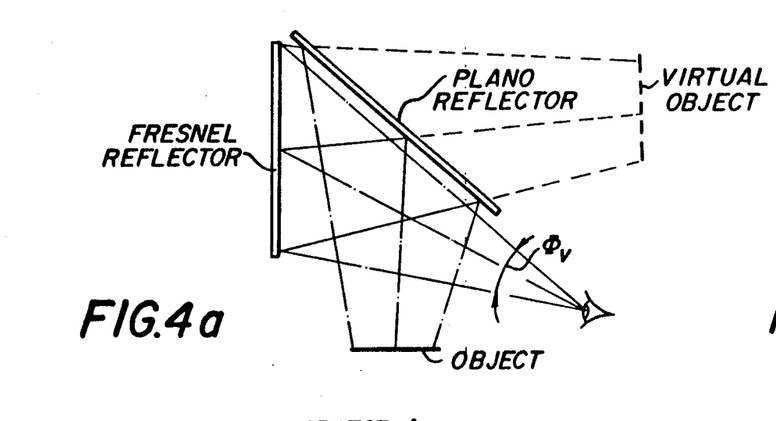
Figure 4B:
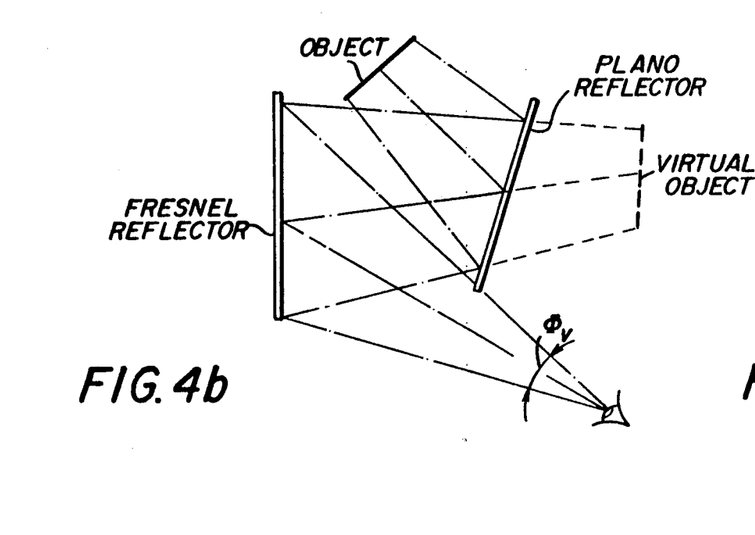
Figure 4C:
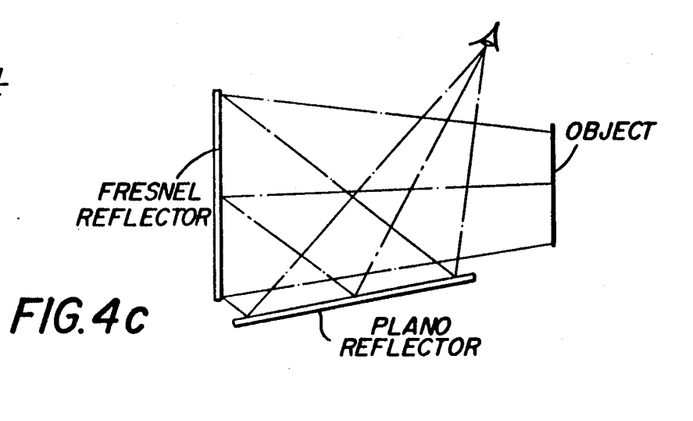
Figure 4D:
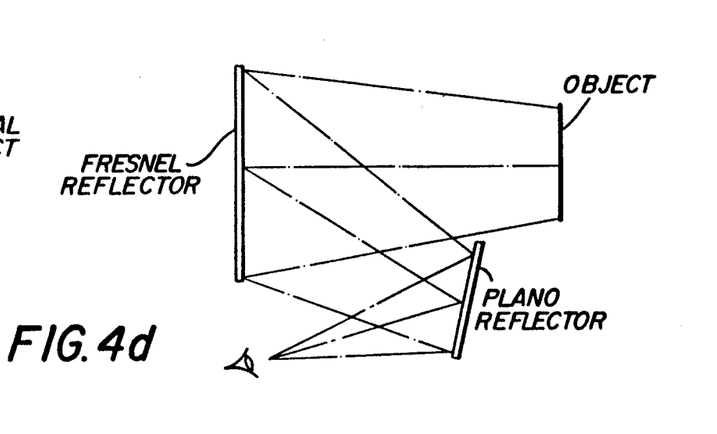
Figure 5:
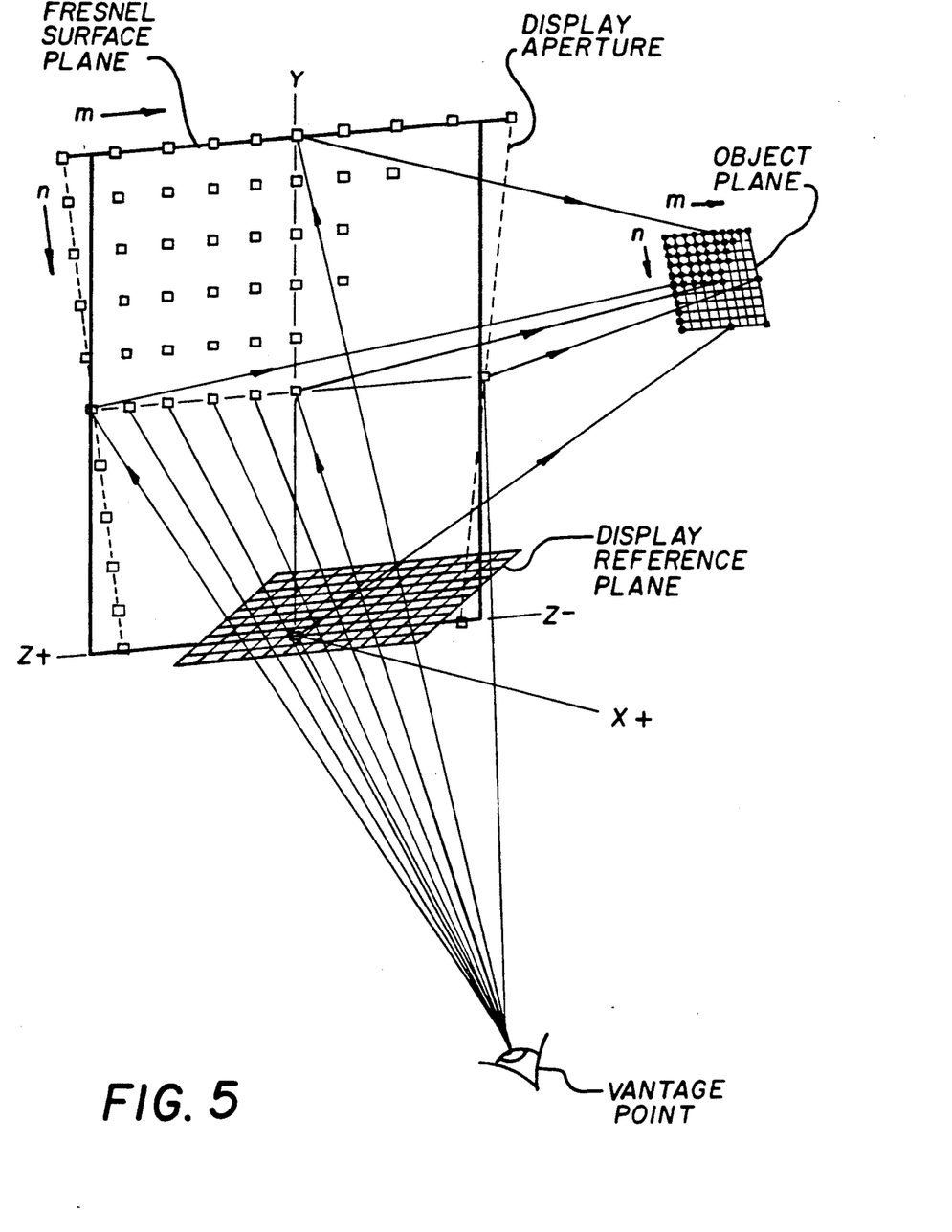
FIG. 5 shows an isometric view of the Fresnel surface of a display and the observer's vantage point such as shown in FIG. 4-a and the coordinate system chosen for directional orientation. The rectangular array of points covering the Fresnel surface extends in the $+Y$ and the $+$ and $-Z$ directions.
Figures 6A, 6B:
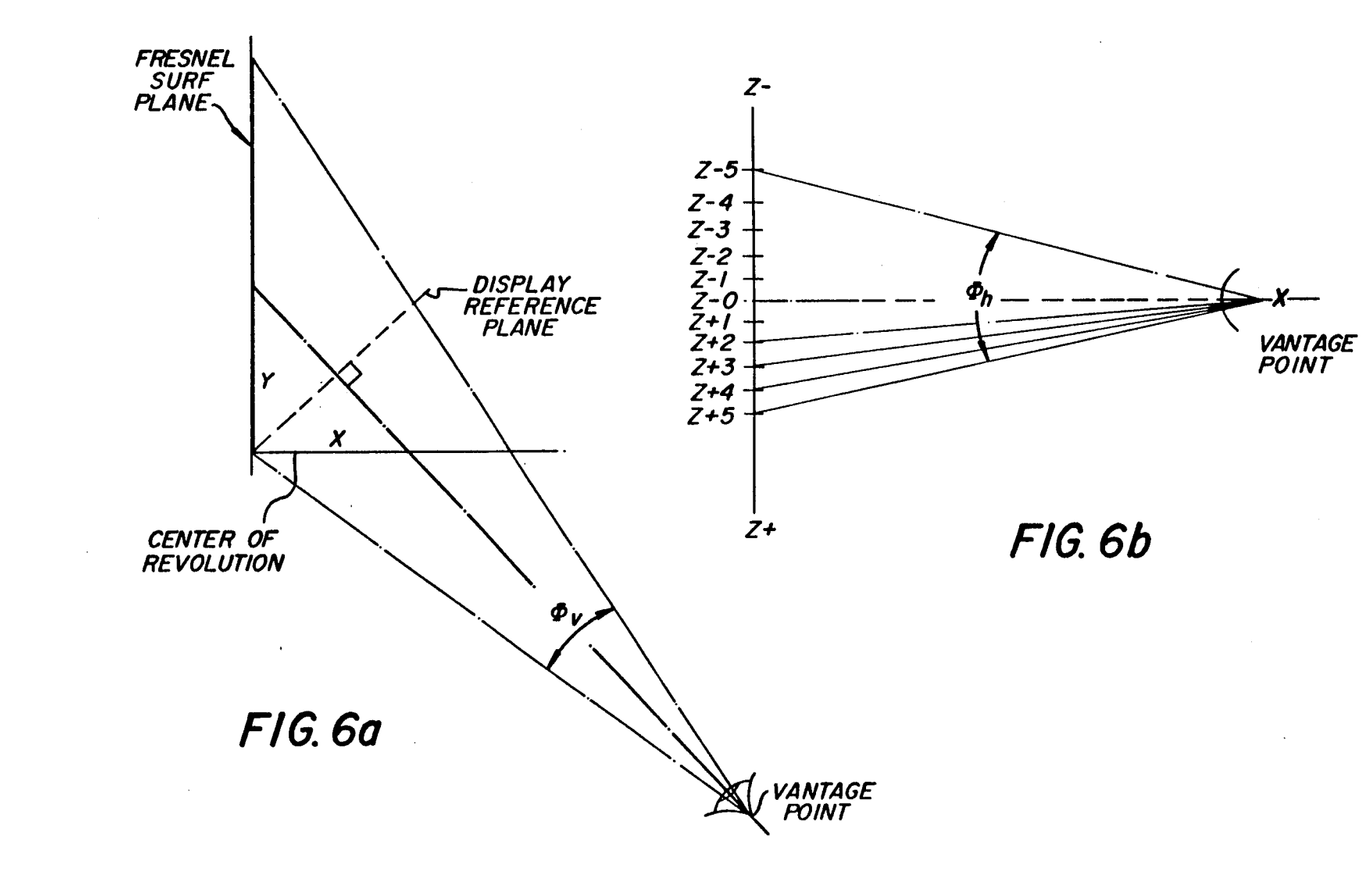

An illustration of this condition is shown in FIG. 3. The Fresnel reflector is located in plane r—r', the object in plane o—o' and the observer's vantage point is point v. Input directerix v-$F_i$ corresponds to output directerix $F_i$-$o_i$, v-$F_{ii}$ with $F_{ii}$-$o_{ii}$, and v-$F_{iii}$ with $F_{iii}$-$o_{iii}$. These correspondences are possible since the facet slopes $F_i$, $F_{ii}$, and $F_{iii}$ have mirror normals which bisect the corresponding angles between the input and output directerixes.

BRIEF DESCRIPTION OF THE DRAWINGS

FIGS. 4-a through 4-d show side views of the four illustrative arrangements of a Fresnel reflector and a second reflector to result in an erect, right-reading image. The vertical angular subtense of the display is shown in each illustration as angle $\phi_v$.

FIG. 6-a shows the side view of the same Fresnel surface as shown in FIG. 4-a as seen in a plane passing through the center of revolution of the Fresnel surface and the $Z=0$ points illustrating the direction cosines relative to the X- and Y-axes for the Y6 point in a series of rows Y1 and Y11.

FIG. 6-b shows the top view of the same Fresnel surface as shown in FIG. 4-a with the direction cosines relative to the X- and Z.

DETAILED DESCRIPTION OF THE PREFERRED EMBODIMENT

Figure 7:
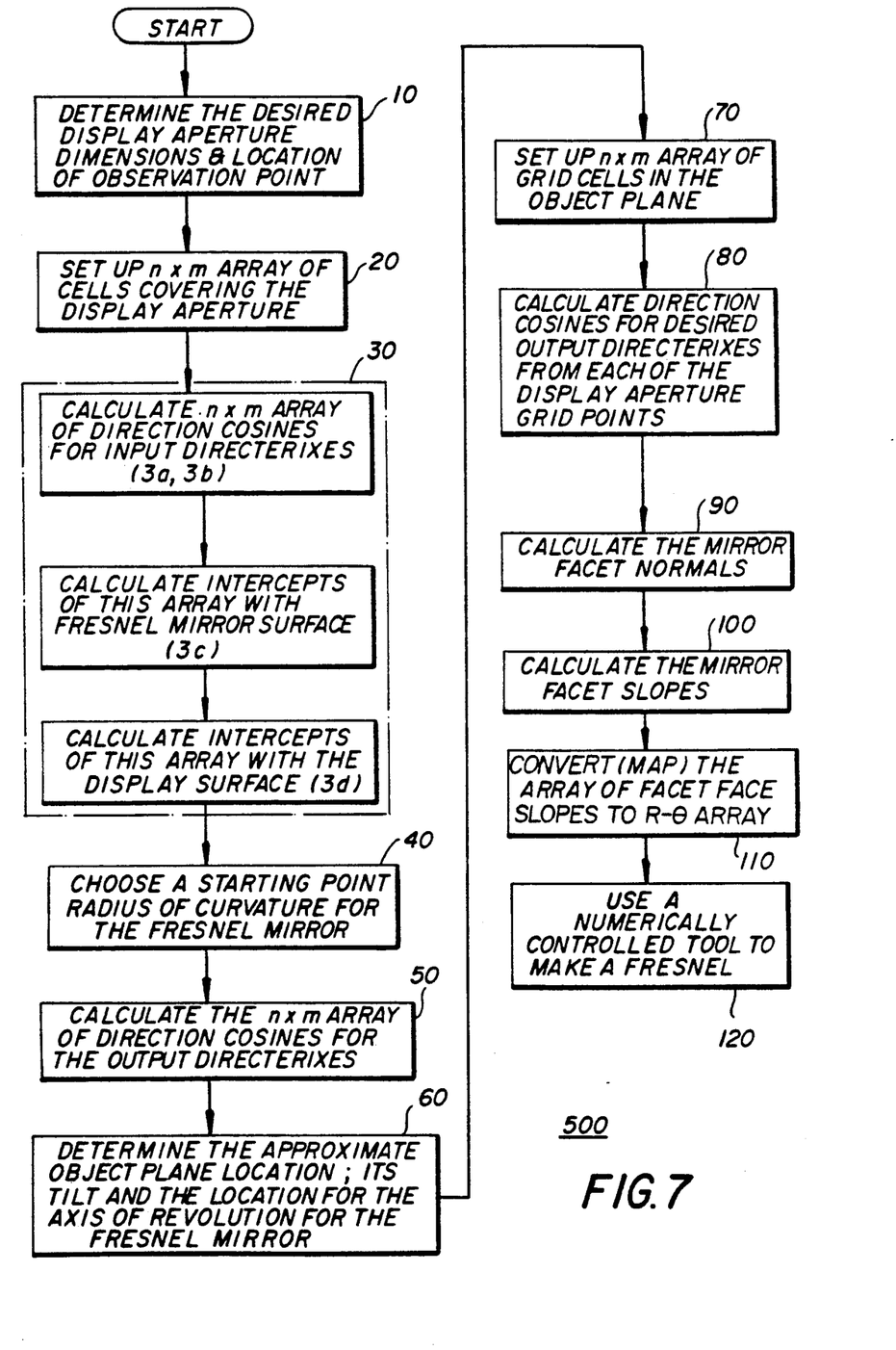
FIG. 7 shows an illustrative embodiment of the flow chart exemplifying the method.

The method of defining the set of facet face slopes for the mirror in an image display system consists of the following generation steps and is greatly facilitated by a spread sheet program illustrated in FIG. 7.

The first step in this spread sheet program illustrated by box 10, shown in FIG. 7, is to determine from the ergonomics of the intended display application the desired image display aperture dimensions and the location of the eye's vantage point relative to the Fresnel reflector. This establishes the angular subtense of the display aperture as seen by the observer and establishes the optimum configuration of four types which include a plano reflector to render the image erect and right-reading. (Provided the secondary reflector is plano, it is not necessary to include its geometry in the facet face optimization program.) From a practical standpoint, as the angular subtense of the image increases, the tolerance tightens for locating the eye's at the nominal vantage point.

The second step in the spread sheet program illustrated by box 20 is to define a two dimensional n×m array of cells (grid points) covering the entire display aperture as an odd number of vertical columns and an odd number of horizontal rows.

Step three in the spread sheet program illustrated by box 30, is to calculate an n×m array of the direction cosines for the input directerixes, and then to calculate the intercepts of this array with the Fresnel mirror surface as well as with the display surface. The obtained results are stored for later use. The greater details of this computation is given below in steps 3a through 3d:

3a. The direction cosines for each of an angularly uniform fan of vertical input directerixes extending from the nominal vantage point fully covering the vertical angular subtense ($\phi_v$) of the display aperture and equal in quantity to the number of vertical columns is calculated using a spreadsheet program on a computer.

3b. The direction cosines for each of an angularly uniform fan of a number equal to the number of horizontal rows of horizontal input directerixes extending from the nominal vantage point fully covering the horizontal angular subtense of the display aperture ($\phi h$) is calculated using a spreadsheet program on a computer.

3c. A rectangular array of input directerixes is established with vertical axis direction cosines and horizontal axis direction cosines established in steps 3a. and 3b. The intercepts of this array of fans with the Fresnel surface plane are calculated and stored in the spreadsheet for future reference.

3d. The intercepts of this array with a display reference plane which is normal to the input directerix associated with the center point of the display aperture are calculated and stored in the spreadsheet for future reference.

Next, in step 4, illustrated by box 40 of FIG. 7, we chose a starting nominal retroreflecting radius of curvature for the Fresnel reflector. The nominal radius of curvature should be approximately 2 times the distance from the vantage point to the reflector measured along the X-axis. The starting axis of revolution for the Fresnel reflector is located at the bottom edge of the display aperture.

The direction cosines for the output (reflected) directerixes from each of the array points are calculated is step 5 (box 50, FIG. 7) using matrix multiplication.

Step 6, shown by box 60, FIG. 7 involves determination of the approximate object plane location and required amount of tilt of the object plane, as well as approximate location for the axis of revolution of the Fresnel mirror. The detailed description is given in the following steps 6a through 6c:

6a. The object plane is geometrically located to intercept the array of output directerixes with a magnifying power sufficient to meet the needs of the display system. The intercepts of each of the output directerixes with the object plane is plotted and displayed using the spreadsheets graphing function. As the object plane is moved closer to the Fresnel reflector, the dimensional size of the object visible to the eye from the nominal vantage point will increase (with correspondingly less magnification).

6b. If the plot of these intercepts does not approximate a rectangular grid similar to the original array of points, location of the axis of revolution relative to the display aperture for the Fresnel reflector should be changed and the output directerixes from the array points be recalculated.

6c. The angle of the object plane can be tilted to minimize the trapezoidal error seen in the plotted intercepts of the reflected directerixes with the object plane coordinates. If the angle of the object plane is to be constrained by the ergonomics of the display system, this trapezoidal error will also be addressed by facet slope correction.

Next, in step 7, a target set (n×m array) of cells or grid points is set up in the object plane which has vertical and horizontal intervals proportional to the respective vertical and horizontal intervals on the display reference plane determined in step 3d. above. This step is shown as box 70 in FIG. 7.

The direction cosines for the desired output directerixes from each of the display aperture array points to the target set of grid points are calculated and stored for later use. Step 8 is illustrated by box 80 in FIG. 7.

In step 9, (shown by box 90, FIG. 7) the mirror facet normals which would result in the desired reflected directerixes at each of the display aperture array points is respectively calculated from the vector sum of the input directerix and the desired output directerix. The mirror facet normal bisects the angle formed in the plane formed by the incoming and reflected rays or directerixes.

The facet face slopes are calculated in step 10 of the program 500 as illustrated by box 100, FIG. 7. The facet face slopes are lines normal to the mirror normals at each point and intersecting the axis of revolution of the Fresnel reflector.

In step 11, illustrated by box 110, FIG. 7, a mapping conversion is made from the (x,y) array of facet face slopes (calculated in step 10) to a uniform $(R,\theta)$ array of facet face coordinates with an interpolation subroutine.

For a binocular system, the resulting set of mirror normals are re-evaluated for a lateral displacement of the vantage point equal to one-half of the desired interpupillary separation of the observer. Further optimization is then possible by changing the beginning nominal radius of curvature (step 4. above) and by aspherizing this nominal curve by a radius function of the vertical height of the display aperture.

In the final step 12, illustrated by box 120, FIG. 7, the facet face slopes data is used by a numerically controlled tool, to generate either an actual Fresnel mirror surface, or a mold for a Fresnel mirror surface. A numerically controlled tool, for example, may be a numerically-controlled lathe apparatus which has the capability of tilting the cutting tool in response to changes in the $(R,\theta)$ data points. Appendix A shows an example of subject invention and corresponds to the flow chart depicted on FIG. 7.

The invention has been described in detail with particular reference to a presently preferred embodiment, but it will be understood that variations and modifications can be effected within the spirit and scope of the invention. For example, while illustrative embodiments utilized a plano secondary reflector, it can also be curved and its effect included in the spreadsheet.

APPENDIX

This spreadsheet is used by entering a set of assumed values into the DATAIN section and applying the macro \R by hitting the {alt} and R keys together. The computer should have a math co-processor and the calculation mode should be set to MANUAL (as set by the keystrokes \wgrm).

After the calculations are complete, the macro will end up with a graph display of the output directerixes intercepts with the object plane. Ideally, this graph should look like a square grid pattern. By experimenting with the input values, particularly the shaping function, some improvement to the initial pattern can achieved. The keystrokes \gnu will bring up predefined graphs including a meridional plan, or side view of the system which also helps visualize the way the system is working, particularly for relocating the object plan or tilting it.

This section is used to input the basic layout parameters needed to operate the program: a spherical base radius is assumed from experience. The size of the grid pattern on the Fresnel surface is established by the step size. This will establish an approximately square grid pattern on the Y-Z plane containing the Fresnel surface. The quantities u(x), u(y), and u(z) establish a vantage point for the eye with the X-axis extending along the lathe axis of the machine which generated the Fresnel surface (or its mold). The shaping function is a way to linearly aspherize the assumed radius base radius. Experimenting with this may lead to an acceptable solution faster than facet tool swings alone. Similarly, tilting the object plane will help reduce/eliminate keystoning.

FRESNEL MIRROR OPTIMIZATION PROGRAM

| Base Radius: | 200 | | | | Horz Field | -15.2489 |
|---|---|---|---|---|---|---|
| Step(mm) | Shaping function: | | | Vert Field | 25.52 | |
| 10 | 0.00001 | 0.000012 | | Slope of Obj Plane: | -10 | |
| u(x), u(y), | u(z): | u'(x) | u'(y) | X Intercept of Obj Plane: | b(x) | 90 |
| 210 | -150 | -38 | 210 | -150 plane | b(y) | 900 |
| Fresnel Axis Displmnt: | | 0 | | | | |

Y Surface Points

If the Fresnel surface is assumed to lie in the Y-Z plane, the angles from the vantage point to each point on the mapping grid must be calculated. It is also necessary to calculate the local surface radius at each grid point, if the shaping function option has been used. Rho(n) is the angle of inclination from the eye's vantage point and Alpha(n) is the angle from each point to the lathe axis. Please note that the grid is a regular series of angular steps which result in uneven steps on the Fresnel surface itself because it is nominally tilted relative to the viewing direction.

| n | K(n) | Rho(n) | | Y(n) | Alpha(n) | | K[R(Fresnel)] | Vantage Point |
|---|---|---|---|---|---|---|---|---|
| | | | | | | | | Rho(max)=0.872 |
| 0 | 200.000 | 0.620249 | -0.00039 | 0.00 | 0.0000 | 0.001042 | 200.256 | Rho(min)=0.620 |
| 1 | 200.012 | 0.645438 | -0.00034 | 8.14 | 0.0407 | 0.001042 | 200.240 | Rho(dlt)=0.025 |
| 2 | 200.042 | 0.670626 | -0.00030 | 16.59 | 0.0827 | 0.001042 | 200.241 | |
| 3 | 200.083 | 0.695815 | -0.00025 | 25.38 | 0.1262 | 0.001042 | 200.253 | |
| 4 | 200.126 | 0.721004 | -0.00021 | 34.56 | 0.1710 | 0.001042 | 200.264 | |
| 5 | 200.157 | 0.746192 | -0.00016 | 44.15 | 0.2171 | 0.001042 | 200.262 | |
| 6 | 200.159 | 0.771381 | -0.00010 | 54.19 | 0.2644 | 0.001042 | 200.230 | |
| 7 | 200.112 | 0.796570 | -0.00005 | 64.75 | 0.3129 | 0.001041 | 200.147 | |
| 8 | 199.987 | 0.821759 | 0.000004 | 75.86 | 0.3625 | 0.001040 | 199.984 | |
| 9 | 199.749 | 0.846947 | 0.000065 | 87.58 | 0.4132 | 0.001039 | 199.706 | |
| 10 | 199.349 | 0.872136 | 0.000130 | 100.00 | 0.4650 | 0.001037 | 199.264 | |

Z Surface Points

In order to establish a angular grid, and we assume the Y-axis is vertical, a corresponding series of points has to be determined in the horizontal, or Z-direction. In this spreadsheet the facet geometry is calculated for an even number of Z steps on either side of Z=0. The value of the Z step is incremented and all the Y values along that Z step are calculate and then copied into another section of the spreadsheet.

| | -5 | | | Direction cos of input directrix | | |
|---|---|---|---|---|---|---|
| n:: | eta(n) | Z(n) | R(Fresnel) | cos(alpha) | cos(beta) | cos(gamma) |
| 0 | -1.57 | -36.21 | 36.21 | -0.8137 | 0.5812 | 0.0069 |
| 1 | -1.35 | -36.21 | 37.11 | -0.7988 | 0.6015 | 0.0068 |
| 2 | -1.14 | -36.21 | 39.83 | -0.7834 | 0.6215 | 0.0067 |
| 3 | -0.96 | -36.21 | 44.22 | -0.7675 | 0.6410 | 0.0065 |
| 4 | -0.81 | -36.21 | 50.05 | -0.7511 | 0.6601 | 0.0064 |
| 5 | -0.69 | -36.21 | 57.10 | -0.7343 | 0.6788 | 0.0063 |
| 6 | -0.59 | -36.21 | 65.18 | -0.7169 | 0.6971 | 0.0061 |
| 7 | -0.51 | -36.21 | 74.18 | -0.6992 | 0.7149 | 0.0060 |
| 8 | -0.45 | -36.21 | 84.05 | -0.6809 | 0.7323 | 0.0058 |
| 9 | -0.39 | -36.21 | 94.77 | -0.6623 | 0.7493 | 0.0056 |
| 10 | -0.35 | -36.21 | 106.35 | -0.6432 | 0.7657 | 0.0055 |

Geometry of Assumed Surface

Using the base radius and any shaping functions, the facet slopes
of the Fresnel surface at each of the grid points can be calculated
as being normal to the K[R(Fresnel)] line, one end of which
lies on the lathe axis and the other end of which lies on the grid
intersection on the Fresnel itself. Once the facet slope
is calculated, the direction cosines of the output directerix at each
corresponding grid point can be calculated by vector addition.
I.e. the sum of unit vectors along the input directerix, the output
directerix, and the K[R(Fresnel)] line must be zero if we assume
energy is conserved. (All light is reflected in the same direction.)
Consequently, if we know two of the three vectors, the output
directerix can be determined from the negative vector of the
sum of the other two.

```
:    Facet    Direction cos of facet      Direction cos of output directerix
:    Alpha(n)    HX        HY        HZ    cos(alpha)cos(beta)cos(gamma)
:
:    -0.1789  -0.9840   0.0000   -0.1779  0.759759  0.581224  0.291452  -36.2109
:    -0.1833  -0.9853   0.0400   -0.1778  0.790638  0.536948  0.294238  -36.2109
:    -0.1963  -0.9808   0.0812   -0.1774  0.820505  0.488596  0.296721  -36.2109
:    -0.2173  -0.9765   0.1238   -0.1766  0.848831  0.436112  0.298816  -36.2109
:    -0.2449  -0.9702   0.1574   -0.1754  0.875047  0.379511  0.300437  -36.2109
:    -0.2777  -0.9617   0.2120   -0.1739  0.898561  0.318882  0.301499  -36.2109
:    -0.3147  -0.9509   0.2574   -0.1720  0.918764  0.254396  0.301918  -36.2109
:    -0.3549  -0.9377   0.3033   -0.1696  0.935049  0.186302  0.301618  -36.2109
:    -0.3979  -0.9219   0.3497   -0.1669  0.946822  0.114920  0.300534  -36.2109
:    -0.4431  -0.9034   0.3962   -0.1638  0.953508  0.040634  0.298615  -36.2109
:    -0.4903  -0.8822   0.4427   -0.1603  0.954558  -0.03612  0.295826  -36.2109
```

Object Plane Intercepts

The vector information for each output directerix is now completely
determined, given its direction cosines and its point of origin
(from the corresponding grid point on the Fresnel surface).
Since we also established a location and tilt of the object plane
in the input section, the intersections of the output directerixes
with the object plane can be calculated. This data is also copied
into a reference matrix elsewhere in the spreadsheet.

```
Intercepts of directerix wi Object Plane
    x         y          z          h          h-h(5)

83.60418  63.95813   -4.13934   64.27713    -9.56829
83.51455  64.85404   -5.13062   65.17750    -8.66791
83.37631  66.23684   -6.05931   66.56720    -7.27821
83.18761  68.12383   -6.92612   68.46360    -5.38181
82.94679  70.53206   -7.73204   70.88384    -2.96157
82.65210  73.47894   -8.47815   73.84542         0
82.30173  76.98263   -9.16543   77.36659     3.52167
81.85376  81.06232   -9.79445   81.46662     7.62120
81.42618  85.73817  -10.3650    85.16575     8.799205
80.89690  91.03091  -10.8759    91.48493    10.01831
80.30393  96.96067  -11.3239    97.44426    11.27847
```

Useful System Parameters

Once the intercepts on the object plane have been calculated, the size of the object that will occupy the visual field of the Fresnel surface can be calculated. This may lead one to relocate the object plane if a different magnification is desired or if the actual application utilizes a larger or smaller object.

---

Reference Object Size

Width/2   -15.2489
Height    35.52

Object Size Subtended at 13 inches

Horz   -0.04614
Vert   0.107167

Magnification at Eye Position

Horz   1.564130
Vert   2.350407

---

REFERENCE STORAGE SECTION

The cells to the right of this description, and contained within vertical bars {| ...|} contains the values of the output directerixes and their object plane intercepts for plotting and/or adjusting.

| cos(alpha) | cos(beta) | cos(gamma) | Alpha(n) | MX | MY | MZ | cos(alpha) | cos(beta) | cos(gamma) |
|---|---|---|---|---|---|---|---|---|---|
| -0.8051 | 0.5750 | 0.1457 | 0.0000 | -1.0000 | 0.0000 | 0.0000 | 0.805052822 | 0.575037730 | 0.145676225 |
| -0.7906 | 0.5954 | 0.1431 | -0.0407 | -0.9932 | 0.0406 | 0.0000 | 0.836365358 | 0.529174424 | 0.143064378 |
| -0.7757 | 0.6153 | 0.1404 | -0.0827 | -0.9966 | 0.0826 | 0.0000 | 0.866432776 | 0.479158810 | 0.140360529 |
| -0.7602 | 0.6349 | 0.1376 | -0.1262 | -0.9920 | 0.1259 | 0.0000 | 0.894696363 | 0.424963498 | 0.137566137 |
| -0.7443 | 0.6541 | 0.1347 | -0.1710 | -0.9854 | 0.1702 | 0.0000 | 0.920564291 | 0.366635986 | 0.134682730 |
| -0.7279 | 0.6729 | 0.1317 | -0.2171 | -0.9765 | 0.2154 | 0.0000 | 0.943424788 | 0.304305151 | 0.131711900 |
| -0.7110 | 0.6913 | 0.1287 | -0.2644 | -0.9652 | 0.2613 | 0.0000 | 0.962661105 | 0.235183559 | 0.128655205 |
| -0.6936 | 0.7093 | 0.1255 | -0.3129 | -0.9514 | 0.3078 | 0.0000 | 0.977666826 | 0.168564620 | 0.125514671 |
| -0.6758 | 0.7268 | 0.1223 | -0.3625 | -0.9350 | 0.3546 | 0.0000 | 0.987858485 | 0.095814003 | 0.122291757 |
| -0.6576 | 0.7429 | 0.1190 | -0.4132 | -0.9155 | 0.4016 | 0.0000 | 0.992686957 | 0.020355306 | 0.118958512 |
| -0.6389 | 0.7606 | 0.1156 | -0.4650 | -0.8928 | 0.4484 | 0.0000 | 0.991638111 | -0.057734919 | 0.115606770 |
| -0.8015 | 0.5725 | 0.1725 | -0.0360 | -0.9994 | 0.0000 | 0.036 | 0.811367143 | 0.572521064 | 0.114417535 |
| -0.7873 | 0.5926 | 0.1695 | -0.0543 | -0.9985 | 0.0406 | 0.0360 | 0.842910080 | 0.525533370 | 0.115748351 |
| -0.7725 | 0.6128 | 0.1663 | -0.0902 | -0.9955 | 0.0826 | 0.0359 | 0.872095482 | 0.476425954 | 0.107035315 |
| -0.7573 | 0.6324 | 0.1630 | -0.1311 | -0.9914 | 0.1252 | 0.0357 | 0.900637015 | 0.422113855 | 0.103309483 |
| -0.7415 | 0.6517 | 0.1596 | -0.1746 | -0.9848 | 0.1701 | 0.0355 | 0.926175735 | 0.363700783 | 0.099578523 |
| -0.7253 | 0.6705 | 0.1561 | -0.2199 | -0.9759 | 0.2152 | 0.0351 | 0.948693164 | 0.301315469 | 0.095865875 |
| -0.7086 | 0.6890 | 0.1525 | -0.2666 | -0.9647 | 0.2612 | 0.0347 | 0.967576160 | 0.235153917 | 0.052150063 |
| -0.6914 | 0.7070 | 0.1488 | -0.3147 | -0.9509 | 0.3077 | 0.0342 | 0.982221984 | 0.165516474 | 0.088567252 |
| -0.6737 | 0.7246 | 0.1450 | -0.3640 | -0.9345 | 0.3544 | 0.0237 | 0.992051687 | 0.092769185 | 0.085013685 |
| -0.6556 | 0.7418 | 0.1411 | -0.4145 | -0.9153 | 0.4013 | 0.0330 | 0.996519403 | 0.017335486 | 0.081538700 |
| -0.6371 | 0.7585 | 0.1371 | -0.4660 | -0.8934 | 0.4482 | 0.0323 | 0.995114876 | -0.06032306 | 0.078150552 |
| -0.7974 | 0.5696 | 0.1991 | -0.0720 | -0.9974 | 0.0000 | 0.0719 | 0.817753966 | 0.569606289 | 0.082626424 |
| -0.7834 | 0.5899 | 0.1956 | -0.0826 | -0.9966 | 0.0405 | 0.0718 | 0.848415481 | 0.523563052 | 0.077922554 |
| -0.7689 | 0.6093 | 0.1918 | -0.1094 | -0.9940 | 0.0824 | 0.0715 | 0.877796219 | 0.473401678 | 0.073243753 |
| -0.7538 | 0.6296 | 0.1882 | -0.1449 | -0.9895 | 0.1255 | 0.0713 | 0.905344820 | 0.419098371 | 0.068602527 |
| -0.7383 | 0.6488 | 0.1843 | -0.1850 | -0.9823 | 0.1697 | 0.0708 | 0.930478007 | 0.360703431 | 0.064060223 |
| -0.7222 | 0.6677 | 0.1803 | -0.2280 | -0.9741 | 0.2148 | 0.0702 | 0.952592476 | 0.298347368 | 0.059635742 |
| -0.7057 | 0.6862 | 0.1762 | -0.2732 | -0.9629 | 0.2607 | 0.0694 | 0.971080470 | 0.232243137 | 0.055370075 |
| -0.6888 | 0.7043 | 0.1719 | -0.3201 | -0.9492 | 0.3071 | 0.0684 | 0.985344101 | 0.162683277 | 0.051294774 |
| -0.6713 | 0.7220 | 0.1676 | -0.3685 | -0.9329 | 0.3538 | 0.0673 | 0.994808591 | 0.090031379 | 0.047436455 |
| -0.6534 | 0.7392 | 0.1631 | -0.4182 | -0.9138 | 0.4007 | 0.0660 | 0.998931368 | 0.014707833 | 0.043815434 |
| -0.6351 | 0.7560 | 0.1585 | -0.4691 | -0.8920 | 0.4475 | 0.0645 | 0.997204469 | -0.06282866 | 0.040445066 |

```
ETA    Intercepts of directerix wi Object Plane      :
  1       x          y          z         h        h-h(5,0) :
0.00      84         60        15.2     60.29925   -10.9447 :
0.00   83.87924   61.20753  14.34795   61.51281    -9.73120 :
0.00   83.71175   62.88243  13.56115   63.19606    -8.04795 :
0.00   83.49574   65.04255  12.83808   65.36695    -5.87706 :
0.00   83.22942   67.70576  12.17684   68.04345    -3.20057 :
0.00   82.91095   70.89045  11.57523   71.24402        0    :
0.00   82.53840   74.61590  11.03088   74.98805    3.744031 :
0.00   82.10574   78.90252  10.54140   79.29605    8.052034 :
0.00   81.62281   83.77181  10.10448   84.18963   12.94561  :
0.00   81.07540   89.24591   9.718111  89.69103   18.44700  :
0.00   80.46535   95.34646   9.380780  95.82201   24.57798  :
1.57   84.07136   59.28633  13.41908   59.58203   -11.6619  :
0.72   83.94276   60.57233  11.75386   60.87444   -10.3695  :
0.41   83.76824   62.31751  10.68438   62.62832    -8.61569 :
0.28   83.54596   64.54031   9.859900  64.86221    -6.38180 :
0.21   83.27407   67.25923   9.158836  67.59455    -3.64932 :
0.16   82.95067   70.49327   8.543989  70.84486    -0.39916 :
0.13   82.57376   74.26231   7.999757  74.63270    3.388682 :
0.11   82.14126   78.58736   7.517586  78.97932    7.735303 :
0.09   81.65095   83.49046   7.091767  83.90586   12.66285  :
0.08   81.10057   88.99426   6.718016  89.43813   18.19410  :
0.07   80.48791   95.12088   6.392983  95.59530   24.35128  :
1.57   84.13928   58.60719  10.07228   58.89949   -12.3445  :
1.06   84.00249   59.97505   8.772859  60.27418   -10.9698  :
0.72   83.82071   61.79286   7.709639  62.10105    -9.14296 :
0.52   83.59202   64.07974   6.851356  64.39935    -6.84467 :
0.40   83.31450   66.85491   6.131223  67.18836    -4.05565 :
0.32   82.98619   70.13809   5.510943  70.48790    -0.75611 :
0.26   82.60501   73.94985   4.970111  74.31868    3.074664 :
0.22   82.16881   78.31187   4.496661  78.70245    7.458435 :
0.19   81.67531   83.24680   4.082462  83.66200   12.41797  :
0.16   81.12221   88.77785   3.721390  89.22064   17.97661  :
0.14   80.50723   94.92765   3.408460  95.40111   24.15709  :
```

Facet Angle Correction

This section determines how the facets must be changed from the assumed
input values to provide an undistorted distribution of output directerix
intercepts with the object plane. This data would then be used to
generate a table of corrected facet slopes when machining the Fresnel
surface or its mold face.

```
Normalized Intercepts                                            Direction cos of redirected output directrx
              h(ideal)    y(ideal)    x(ideal)   z(ideal)   cos(alpha)  cos(beta)   cos(gamma)

-17.7613786 -15.9594833 55.25458448 58.24344 84.17565 11.86135   0.816872    0.565216    0.115107
-14.0891089 -12.2948550 58.91921876 62.10630 83.75936 11.86135   0.834807    0.537710    0.118177
-10.4967833  -8.70177200 62.51230183 65.89375 83.41062 11.86135  0.854467    0.505096    0.121509
 -6.96454866 -5.15954886 66.05412497 69.62716 83.03728 11.86135  0.875613    0.466539    0.125076
 -3.47230102 -3.17656688 68.03750696 71.71782 82.62821 11.86135  0.904696    0.405883    0.129556
         0   -0.02994813 71.21407384 75.06622 82.49337 11.86135  0.928015    0.347826    0.133435
  3.47230102  3.17656688 74.39064072 78.41462 82.15853 11.86135  0.950121    0.280058    0.137170
  6.94548667  6.37187385 77.58594769 81.78276 81.82172 11.86135  0.965289    0.201625    0.140514
 10.49678330  9.60473301 80.81880666 85.19050 81.48094 11.86135  0.983270    0.112655    0.143137
 14.08910897 12.83398673 84.10806057 88.65768 81.13423 11.86135  0.989397    0.013100    0.144644
```

| | | | | | | | | |
|---|---|---|---|---|---|---|---|---|
| 17.76137867 | 14.73047632 | 85.94455016 | 90.59351 | 80.94064 | 11.86135 | 0.982955 | -0.114234 | 0.144046 |
| -18.0066390 | | | | | 9.012743 | 0.819169 | 0.555506 | 0.087709 |
| -14.2816445 | | | | | 9.012743 | 0.837282 | 0.535304 | 0.090052 |
| -10.6392775 | | | | | 9.012743 | 0.857146 | 0.506679 | 0.092617 |
| -7.05855366 | | | | | 9.012743 | 0.000000 | 0.466055 | 0.095353 |
| -3.51900256 | | | | | 9.012743 | 0.907922 | 0.407331 | 0.098753 |
| -0.39916189 | | | | | 9.012743 | 0.931527 | 0.349142 | 0.101773 |
| 3.519003964 | | | | | 9.012743 | 0.953921 | 0.281218 | 0.104645 |
| 7.058553663 | | | | | 9.012743 | 0.973359 | 0.202676 | 0.107216 |
| 10.63927752 | | | | | 9.012743 | 0.987555 | 0.113146 | 0.109235 |
| 14.28184458 | | | | | 9.012743 | 0.993801 | 0.013158 | 0.110296 |
| 18.00663905 | | | | | 9.012743 | 0.987294 | -0.114733 | 0.109935 |
| -18.2508082 | | | | | 5.975217 | 0.820941 | 0.568032 | 0.058275 |
| -14.4732293 | | | | | 5.975217 | 0.839191 | 0.540534 | 0.059845 |
| -10.7804718 | | | | | 5.975217 | 0.859213 | 0.507901 | 0.061551 |

Facet Angle Correction

CORRECTED VALUES:

| Facet Dir Cosines | | | Facet Angle (from:) | | |
|---|---|---|---|---|---|
| Mx | My | Mz | (MX) | (MY) | (MZ) |
| -0.99986 | 0.006054 | 0.018843 | -0.01670 | -0.00605 | 0 |
| -0.99930 | 0.035441 | 0.015300 | -0.03740 | -0.03544 | 0 |
| -0.99768 | 0.067460 | 0.011537 | -0.06799 | -0.06751 | 0 |
| -0.99473 | 0.102386 | 0.007595 | -0.10264 | -0.10256 | 0 |
| -0.98885 | 0.148863 | 0.003074 | -0.14942 | -0.14941 | 0 |
| -0.98125 | 0.192655 | -0.00102 | -0.19392 | -0.19386 | 0 |
| -0.97065 | 0.240308 | -0.00497 | -0.24283 | -0.24268 | 0 |
| -0.95538 | 0.291873 | -0.00862 | -0.29644 | -0.29618 | 0 |
| -0.93758 | 0.347146 | -0.01178 | -0.35488 | -0.35452 | 0 |
| -0.91393 | 0.405566 | -0.01423 | -0.41791 | -0.41759 | 0 |
| -0.88004 | 0.474877 | -0.01543 | -0.49483 | -0.51737 | 0 |
| -0.99582 | 0.003521 | 0.052270 | -0.04857 | -0.00352 | -0.05229 |
| -0.99845 | 0.032901 | 0.048796 | -0.05564 | -0.04396 | -0.07367 |
| -0.99704 | 0.064928 | 0.045065 | -0.07687 | -0.07034 | -0.11336 |
| -0.97425 | 0.211267 | 0.086981 | -0.22738 | -0.22144 | -0.32418 |
| -0.98869 | 0.145441 | 0.036455 | -0.15053 | -0.15075 | -0.17956 |
| -0.98131 | 0.190329 | 0.032188 | -0.19359 | -0.19406 | -0.20118 |
| -0.97054 | 0.238113 | 0.027961 | -0.24165 | -0.24258 | -0.21376 |
| -0.95686 | 0.289850 | 0.023915 | -0.29478 | -0.29594 | -0.21794 |
| -0.93833 | 0.345337 | 0.020216 | -0.35301 | -0.35425 | -0.21545 |
| -0.91362 | 0.404003 | 0.017045 | -0.41867 | -0.41738 | -0.20941 |
| -0.87925 | 0.473428 | 0.014753 | -0.49523 | -0.49457 | -0.20676 |
| -0.99660 | 0.000969 | 0.086662 | -0.08240 | -0.00096 | -0.08677 |
| -0.99642 | 0.030325 | 0.083307 | -0.08454 | -0.06174 | -0.09580 |
| -0.99522 | 0.062342 | 0.079666 | -0.09771 | -0.08270 | -0.12173 |

LABELS

This section contains labels for attachment to the output graphs.

Base Radius: 200
Shading function: 0.000012
Slope of Obj Plane: -10.0
X intercept of Obj Plane: 90.0
u(x),u(y),u(z):210-150-30
Eye Vantage Point
<-- Object Plane

What is claimed is:

1. A method for generating a Fresnel mirror for an image display system, having an observation point and an object location, said method comprising the following steps:
   A) establishing a representation of a first two-dimensional (n×m) array of cells covering an entire display aperture;
   B) generating at least one input directerix, from the observation point to a location corresponding to each said cell of said array of cells;
   C) establishing a representation of a second, two-dimensional, (n×m) array of cells in an object plane, said second array of cells having vertical and horizontal intervals proportional to vertical and horizontal intervals on said display aperture plane;
   D) generating at least one output directerix, from the object towards the observation point for each of said cells in said second two-dimensional array;
   E) calculating an arrangement of facets on said Fresnel mirror so that said facets uniquely direct "directerixes" from said first two-dimensional array onto said second two-dimensional array to optimize the performance of said image display system, wherein each facet of the array is arranged so that the normal of each facet bisects an angle between the input and output directerixes; and
   F) generating the Fresnel mirror in response to the calculation of the arrangement of facets in step E.

2. A method for generating a Fresnel mirror for an image display system comprising the steps of:
   A) establishing a representation of a two-dimensional (n×m) array of cells covering a full display aperture;
   B) computing an (n×m) array of direction cosines for input "directerixes" and calculating the intercepts of said array of direction cosines with a surface of said Fresnel mirror with a display surface, and storing the obtained results;
   C) establishing a representation of a target set (n×m) array of grid points in an object plane which has vertical and horizontal intervals proportional to vertical and horizontal intervals on a display reference plane;
   D) calculating the (n×m) array of the direction cosines for desired output directerixes originated from the target set of grid points on the object surface;
   E) computing the location and direction of the mirror normals which would result in the desired reflected directerixes at each of the display aperture array points from the vector sum of the input directerix and the desired output directerix;
   F) determining the Fresnel mirror facet slopes from the information given in the previous step;
   G) machining, by numerically controlled means, a mold to manufacture said Fresnel mirror; and
   H) manufacturing said Fresnel mirror by utilizing said mold.

3. A method for designing and manufacturing a Fresnel mirror for an image display system comprising the following steps:
   A) establishing a two-dimensional (n×m) array of cells covering a full display aperture;
   B) computing an (n×m) array of direction cosines for input "directerixes" and calculating the intercepts of said array of direction cosines with a surface of said Fresnel mirror with a display surface, and storing the obtained results;
   C) establishing a target set (n×m) array of grid points in an object plane which has vertical and horizontal intervals proportional to vertical and horizontal intervals on a display reference plane;
   D) calculating the (n×m) array of the direction cosines for desired output directerixes originated from the target set of grid points on the object surface;
   E) computing the location and direction of the mirror normals which would result in the desired reflected directerixes at each of the display aperture array points from the vector sum of the input directerix and the desired output directerix;
   F) determining the Fresnel mirror facet slopes from the information given in the previous step;
   G) machining, by numerically controlled means, a mold to manufacture said Fresnel mirror; and
   H) manufacturing said Fresnel mirror by utilizing said mold; and
   wherein a concave, Fresnel mirror in the form of a non-conically based general asphere, said Fresnel mirror has a plurality of facets having different facet face slopes from each other, said faces located on a surface which is generally made plano and coated with highly reflective material.

4. A method for designing and manufacturing a Fresnel mirror for an image display system comprising the following steps:
   A) establishing a two-dimensional (n×m) array of cells covering a full display aperture;
   B) computing an (n×m) array of direction cosines for input "directerixes" and calculating the intercepts of said array of direction cosines with a surface of said Fresnel mirror with a display surface, and storing the obtained results;
   C) establishing a target set (n×m) array of grid points in an object plane which has vertical and horizontal intervals proportional to vertical and horizontal intervals on a display reference plane;
   D) calculating the (n×m) array of the direction cosines for desired output directerixes originated from the target set of grid points on the object surface;
   E) computing the location and direction of the mirror normals which would result in the desired reflected directerixes at each of the display aperture array points from the vector sum of the input directerix and the desired output directerix;
   F) determining the Fresnel mirror facet slopes from the information given in the previous step; and
   G) manufacturing, by numerically controlled means, a Fresnel mirror having facets with required surface slopes; and
   wherein a concave, Fresnel mirror in the form of a non-conically based general asphere, said Fresnel mirror having a plurality of facets having different facet face slopes from each other, said faces located on a surface which is generally made plano and coated with highly reflective material.

5. An image display system comprising:
   a first, concave, Fresnel mirror in the form of a general asphere;
   a second, planar mirror;
   a framework for holding an object;
   said Fresnel mirror having a plurality of facets having different slopes from each other so that a vector eminating from the eye toward each of the facet faces will reflect towards correctly correlated points on an object space; and said facets having optimized facet slopes to improve the optical performance, wherein said facet slopes are optimized according to the following steps:
A) establishing a two-dimensional (n×m) array of cells covering a full display aperture;
B) computing an (n×m) array of direction cosines for input "directerixes" and calculating the intercepts of said array of direction cosines with a surface of said Fresnel mirror with a display surface, and storing the obtained results;
C) establishing a target set (n×m) array of grid points in an object plane which has vertical and horizontal intervals proportional to vertical and horizontal intervals on a display reference plane;
D) calculating the (n×m) array of the direction cosines for desired output directerixes originated from the target set of grid points on the object surface;
E) computing the location and direction of the mirror normals which would result in the desired reflected directerixes at each of the display aperture array points from the vector sum of the input directerix and the desired output directerix; and
F) determining the Fresnel mirror facet slopes from the information given in the previous step.

6. An image display system comprising a Fresnel mirror, said Fresnel mirror being concave, wherein said Fresnel mirror has a plurality of facets, said facets having an optimized facet face slope in order to improve the optical performance of said image display system, wherein said facet face slopes are optimized according to the following steps:
A) establishing a two-dimensional (n×m) array of cells covering a full display aperture;
B) computing an (n×m) array of direction cosines for input "directerixes" and calculating the intercepts of said array of direction cosines with a surface of said Fresnel mirror with a display surface, and storing the obtained results;
C) establishing a target set (n×m) array of grid points in an object plane which has vertical and horizontal intervals proportional to vertical and horizontal intervals on a display reference plane;
D) calculating the (n×m) array of the direction cosines for desired output directerixes originated from the target set of grid points on the object surface;
E) computing the location and direction of the mirror normals which would result in the desired reflected directerixes at each of the display aperture array points from the vector sum of the input directerix and the desired output directerix;
F) determining the Fresnel mirror facet slopes from the information given in the previous step; and
G) machining by numerically controlled means a mold to manufacture said Fresnel mirror.

7. An image display system according to claim 6, wherein said numerically controlled means is a numerically controlled lathe.

8. An image display according to claim 6 or 7, further utilizing a second planar mirror and a framework for holding an object and other system components.

* * * * *

UNITED STATES PATENT AND TRADEMARK OFFICE
CERTIFICATE OF CORRECTION

PATENT NO. : 5,222,025
DATED : June 22, 1993
INVENTOR(S) : ROY Y. TAYLOR, II

It is certified that error appears in the above-indentified patent and that said Letters Patent is hereby corrected as shown below:

Column 1, line 12, The word "used" should read as --issued--.

Column 25, line 9, After the word "a", --representation of-- should have been inserted.

Signed and Sealed this

Third Day of May, 1994

Attest:

BRUCE LEHMAN

Attesting Officer

Commissioner of Patents and Trademarks